United States Patent [19]
Fujiwara et al.

[11] Patent Number: 5,176,046
[45] Date of Patent: Jan. 5, 1993

[54] CONTROL SYSTEM FOR AN AUTOMATIC TRANSMISSION

[75] Inventors: Takuji Fujiwara; Tatsutoshi Mizobe, both of Hiroshima; Fumiaki Baba, Higashi-Hiroshima; Masahito Kitada; Shinya Kamada, both of Hiroshima; Koichiro Takeuchi, Hatsukaichi, all of Japan

[73] Assignee: Mazda Motor Corporation, Hiroshima, Japan

[21] Appl. No.: 750,863

[22] Filed: Aug. 28, 1991

[30] Foreign Application Priority Data

Aug. 28, 1990 [JP] Japan .................. 2-227813
Sep. 28, 1990 [JP] Japan .................. 2-261394

[51] Int. Cl.⁵ .................................. F16H 61/06
[52] U.S. Cl. ........................... 74/867; 74/844
[58] Field of Search ........................ 74/867, 844

[56] References Cited

U.S. PATENT DOCUMENTS

| | | | |
|---|---|---|---|
| 4,722,250 | 2/1988 | Sumiya et al. | 74/867 |
| 4,930,376 | 6/1990 | Van Selous | 74/844 X |
| 4,955,256 | 9/1990 | Kashihara et al. | 74/867 X |
| 4,987,982 | 1/1991 | Yamaguchi | 74/867 X |
| 5,005,443 | 4/1991 | Sugano | 74/867 X |

FOREIGN PATENT DOCUMENTS 63-186055  8/1988  Japan .

*Primary Examiner*—Dirk Wright
*Attorney, Agent, or Firm*—Keck, Mahin & Cate

[57] ABSTRACT

A control system for an automatic transmission has a shift gear mechanism with a plurality of frictional elements, including a low reverse brake which is selectively actuated for switching a power transmitting path to establish a desired shift stage. A hydraulic control circuit controls supply of a hydraulic fluid to and relief of the fluid from an actuator for the frictional element. An accumulator is provided in a hydraulic passage communicated with the low reverse brake for obviating a shock as the low reverse brake is engaged. Back pressure of the accumulator is controlled when a first shift gear stage is established through the engagement of the low reverse brake. A torque shock can be suppressed when the first stage is established in an L-range.

13 Claims, 7 Drawing Sheets

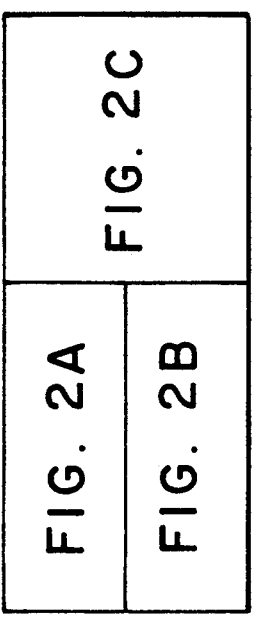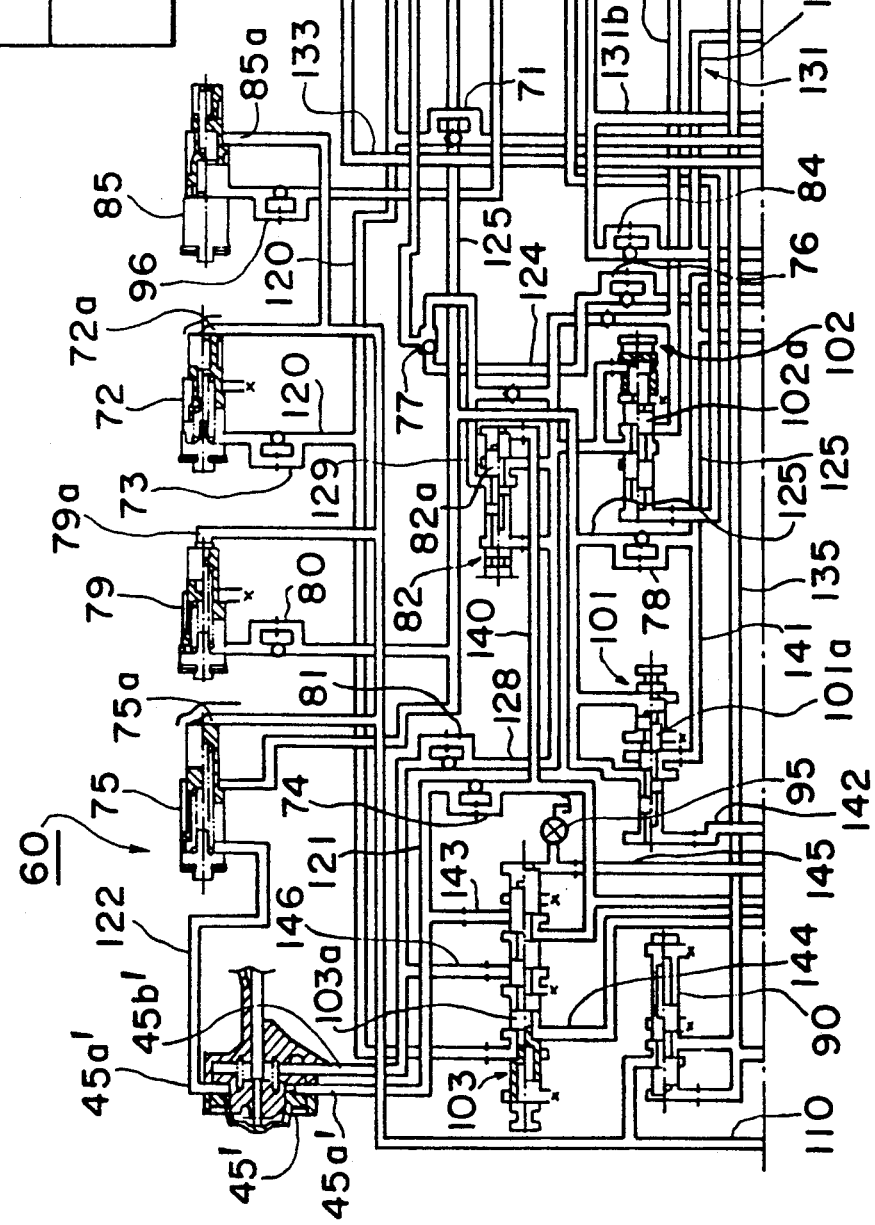

CONTROL SYSTEM FOR AN AUTOMATIC TRANSMISSION

BACKGROUND OF THE INVENTION

1. Field of the Invention 7 The present invention relates to a control system for an automatic transmission.

2. Description of the Prior Art

Generally, an automatic transmission for an automotive vehicle is provided with a torque converter and a shift gear mechanism of which a plurality of frictional elements, such as clutches and brakes, is selectively actuated to switch a power transmitting path to thereby establish a desired shift stage automatically. The automatic transmission includes a hydraulic control unit for controlling a supply od hydraulic fluid to and from an actuator of the frictional element. The hydraulic control unit is provided with a regulator valve for adjusting a hydraulic pressure from an oil pump to a line pressure, a manual valve for manually switching a shift range, a plurality of shift valves for selectively actuating the frictional elements, and auxiliary valves actuated in connection with various operations. In recent years, the shift valve has been controlled through a solenoid so as to accomplish a sophisticated shift control in response to a vehicle operating condition.

In order to obviate a torque shock when the frictional element is engaged, there has been provided an accumulator on a hydraulic passage for supplying a hydraulic fluid as disclosed in Japanese Patent public disclosure (JP A2) No. 63-186055.

In the hydraulic control circuit disclosed the above Japanese publication, an accumulator is provided on a hydraulic passage communicated with a reverse clutch but not on a passage communicated with a low reverse brake. As a result, when a reverse clutch is engaged for establishing a R-range for reverse movement through a range select operation, a torque shock is obviated by virtue of the accumulator. However, when the low reverse brake is engaged for establishing a first stage in a L(low)-range or l-range through a shift operation, a torque shock would not be able to be obviated.

SUMMARY OF THE INVENTION

It is, therefore, an object of the present invention to provide a control system for an automatic transmission which can suppress a torque shock when a range select operation is made for establishing a specific shift range such as a R-range.

It is another object of the present invention to provide a control system for an automatic transmission which can suppress the torque shock when a shift operation is made for establishing a first stage through an engagement of a low reverse brake.

The above and other object of the present invention can be accomplished by a control system for an automatic transmission comprising a shift gear mechanism for providing a plurality of shift stages of different speed ratios, a plu5 rality of frictional elements including a low reverse brake which is to be selectively actuated for switching a power transmitting path to establish a desired shift stage and a hydraulic control circuit for controlling a hydraulic fluid for the frictional elements, an accumulator provided on a hydraulic passage communicated with the low reverse brake for obviating a shock as the low reverse brake is engaged, and back pressure control means for controlling a back pressure of the accumulator when a first stage is established in the shift gear mechanism through the engagement of the low reverse brake.

According to another aspect of the present invention, a bypass passage bypasses an orifice for the accumulator, a shift valve is provided in the bypass passage, and a solenoid valve controls the shift valve to open and close the bypass passage.

According to the above feature of the invention, when the R-range is established, the shift shock is suppressed by virtue of the accumulator attached to the low reverse brake. When the first gear stage is established through the engagement of the low reverse brake such as in the low range, the back pressure of the accumulator is controlled in accordance with the vehicle speed to optimally obviate the shift shock.

In another aspect of the invention, when the manual valve is operated so that the low reverse brake is engaged to establish the first stage, the hydraulic fluid is promptly 5 supplied through the bypass passage to the low reverse brake up to a control pressure of the accumulator at the beginning of engagement of the low reverse brake by switching movement of the shift valve. Thereafter, the bypass passage is closed so that the hydraulic fluid is introduced gradually to the low reverse brake through the orifice.

As a result, a torque shock can be suppressed by providing a single accumulator when the R-range is established and when the first gear stage is established in the L-range through the engagement of the low reverse clutch. Meanwhile, when the manual valve is operated to establish the first stage of the L-range, the supply of the hydraulic fluid can be made promptly and surely.

Further objects, features and advantages of the present invention will become apparent from the Detailed Description of Preferred Embodiment which follows when read in light of the accompanying Figures.

BRIEF DESCRIPTION OF THE DRAWINGS

FIG. 2, 2A, 2B and 2C show a hydraulic control circuit incorporated into the automatic transmission of FIG. 1 for controlling a lock-up clutch;

DETAILED DESCRIPTION OF THE PREFERRED EMBODIMENTS

Figure 1:
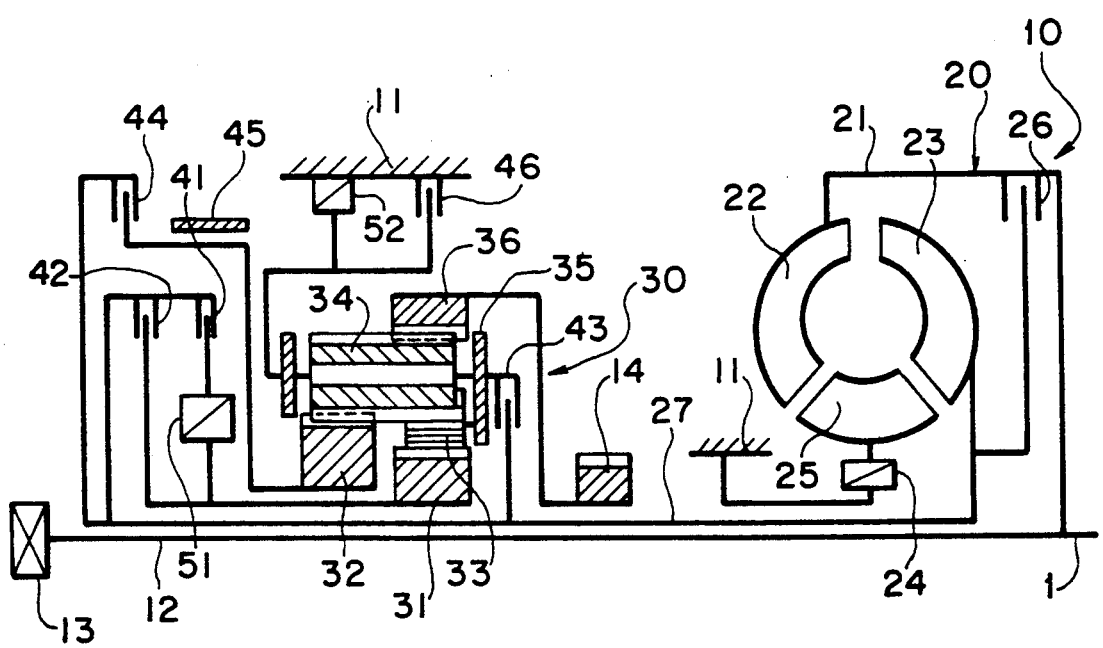
FIG. 1 is a schematic view of an automatic transmission to which a control system in accordance with the present invention can be applied.

Referring to FIG. 1, an automatic transmission 10 #according to the present invention includes a torque converter 20, a shift gear mechanism 30 driven by an output of the torque converter 20, a plurality of frictional elements 41–46 and one-way clutches 51 and 52 for switching a power transmitting path of the shift gear mechanism 30 to establish one of D, 2, L, R-range when running. In the D-range, 1-4th shift stages are provided. 1-3rd shift stages are provided in the 2-range. 1-2nd shift stages are provided in the L-range.

The torque converter 20 includes a pump 22 provided in a case 21 connected with an engine output shaft 1, a turbine 23 facing the pump 22 to be driven by the pump 22 through a hydraulic fluid, a stator 25 disposed between the pump 22 and the turbine 23 and supported by a transmission case 11 through a one-way clutch 24 and a lock-up clutch 26 disposed between the case 21 and the turbine 23 for directly connecting the engine output shaft 1 with the turbine 23. The rotation of the turbine 23 is transmitted to the shift gear mechanism 30 through the turbine shaft 27. The engine output shaft 1 is connected with a pump shaft 12 passing through the turbine shaft 27. The pump shaft 12 drives an oil pump 13 provided at a rear end portion of the automatic transmission 10.

The shift gear mechanism 30 of a Ravigneaux-type planetary gear mechanism includes a small sun gear 31 movably mounted on the turbine shaft 27, a large sun gear 32 movably mounted on the turbine shaft 27 rearward of the small sun gear 31, a plurality of short pinion gears 33 meshed with the small sun gear 31, a long pinion gear 34 meshed with the short pinion gear 33 at a front portion and with the large sun gear 32, a carrier 35 for rotatably carrying the long pinion gear 34 and the short pinion gear 33, and a ring gear 36 meshed with a front portion of the long pinion gear 34.

Between the turbine shaft 27 and the small sun gear 31 are disposed a forward clutch 41 and a first one-way clutch 51 in series and a coast clutch 42 in a juxtaposed relationship with the clutches 41 and 51. A 3-4 clutch 43 is disposed between the turbine shaft 27 and the carrier 35. A reverse clutch 44 is disposed between the turbine shaft 27 and the large sun gear 32. Between the large sun gear and the reverse clutch 44 is disposed a 2-4 brake 45 as a band brake fixing the large sun gear 32. Between the carrier 35 and the transmission case 11 are disposed a second one-way clutch 52 for supporting the carrier 35 against a reactive force acting 5 thereto and a low reverse brake 46 for fixing the carrier 35 in a juxtaposed arrangement. The ring gear 36 is connected with the output gear 14 through which a rotation is transmitted to right and left wheels (not shown) through a differential mechanism.

A relationship between operations of the frictional elements and the shift stages obtained is known so that a detailed explanation of this relationship is omitted. The relationship is shown in Table 1. In table 1, (0) means that the corresponding element is engaged to transmit torque. (*) means that the corresponding element races when coasting.

An actuator 45' of the 2-4 brake 45 includes a servo piston having an apply port 45a' and a release port 45b'. When the hydraulic pressure is introduced only into the apply port 45a', the 2-4 brake 45 is engaged. When the hydraulic pressure is supplied to both the port 45a' and the port 45b' or when no hydraulic pressure is supplied to either of them, the 2-4 brake 45 is disengaged. Actuators of the other frictional elements 41-44 and 46 include the usual hydraulic pistons so that they are engaged when the hydraulic pressure is introduced into the actuators.

The hydraulic control circuit 60 is provided with a regulator valve 61 for adjusting a hydraulic pressure from the oil pump 13 to a main line 110 to a line pressure, a manual valve 62 for selecting a range through manual opera tion and 1-2, 2-3 and 3-4 shift valves 63, 64 and 65 which control the hydraulic pressure for the actuators of the frictional elements 41-46.

The manual valve 62 is provided with an input port e and a first through fourth output ports a-d. When a spool 62a is moved, the input port e is communicated with the first and second output ports a, b in the D-range and 2-range, with the first and third ports a, c in the L-range and with the fourth port d in the R-range. With the output ports a-d are connected lines 111-114 respectively.

In the 1-2, 2-3, 3-4 shift valves 63, 64 and 65, spools 63a, 64a and 65a are urged rightwardly as illustrated. At right end of the spools 63a, 64a and 65a are provided pilot ports 63b, 64b and 65b respectively. With the pilot port 63b of the 1-2 shift valve 63 is connected a pilot line 115 separated from the main line 110 through a line 118. With the pilot port 64b of the 2-3 shift valve 64 is connected a pilot line 116 separated from the first output line 111. With the pilot port 65b is connected a pilot line 117 communicated with the main line 110. On the pilot lines 115, 116 and 117 are provided 1-2, 2-3 and 3-4 solenoid valves 66, 67 and 68. When the solenoid valve 66-68 are energized or ON, the pilot lines 115, 116 and 117 are drained so that the pilot pressure of the ports 63b-65b are discharged. Thus, the spools 63a-65a are placed at the right position. When the solenoid valves 66-67 are deenergized or OFF, the hydraulic pressure is introduced into the pilot ports 63b-65b through the pilot lines 115, 116 and 117 to place the spools 63a-65a at a left position.

The solenoid valves 66-68 are controlled between ON and OFF based on a map defined by the vehicle speed and throttle opening of engine. This causes the

TABLE 1

| RANGE | | CLUTCH | | | | BRAKE | | ONE-WAY CLUTCH | |
|---|---|---|---|---|---|---|---|---|---|
| | | FORWARD (41) | COAST (42) | 3-4 (43) | REVERSE (44) | 2-4 (45) | LOW REVERSE (46) | 1st (51) | 2nd (52) |
| P | | | | | | | | | |
| R | | | | | O | | O | | |
| N | | | | | | | | | |
| D | 1st | O | | | | | | O* | O |
|   | 2nd | O | | | | O | | O* | |
|   | 3rd | O | O | O | | | | O* | |
|   | 4th | O | | O | | O | | | |
| 2 | 1st | O | | | | | | O* | |
|   | 2nd | O | O | | | O | | O* | |
|   | 3rd | O | O | O | | | | O* | |
| 1 | 1st | O | O | | | | O | O* | O |
|   | 2nd | O | O | | | O | | O* | |

Figure 2B:
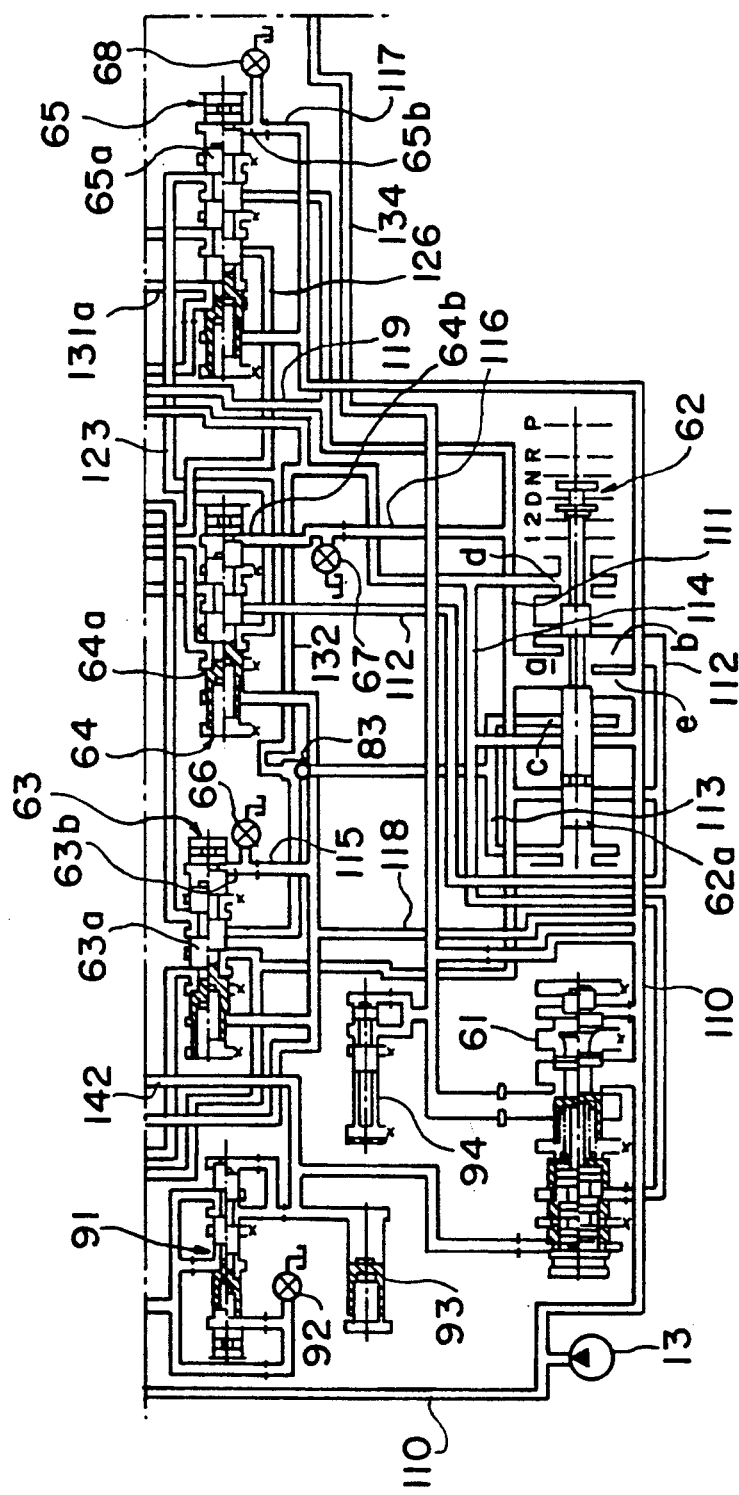
Figure 2C:
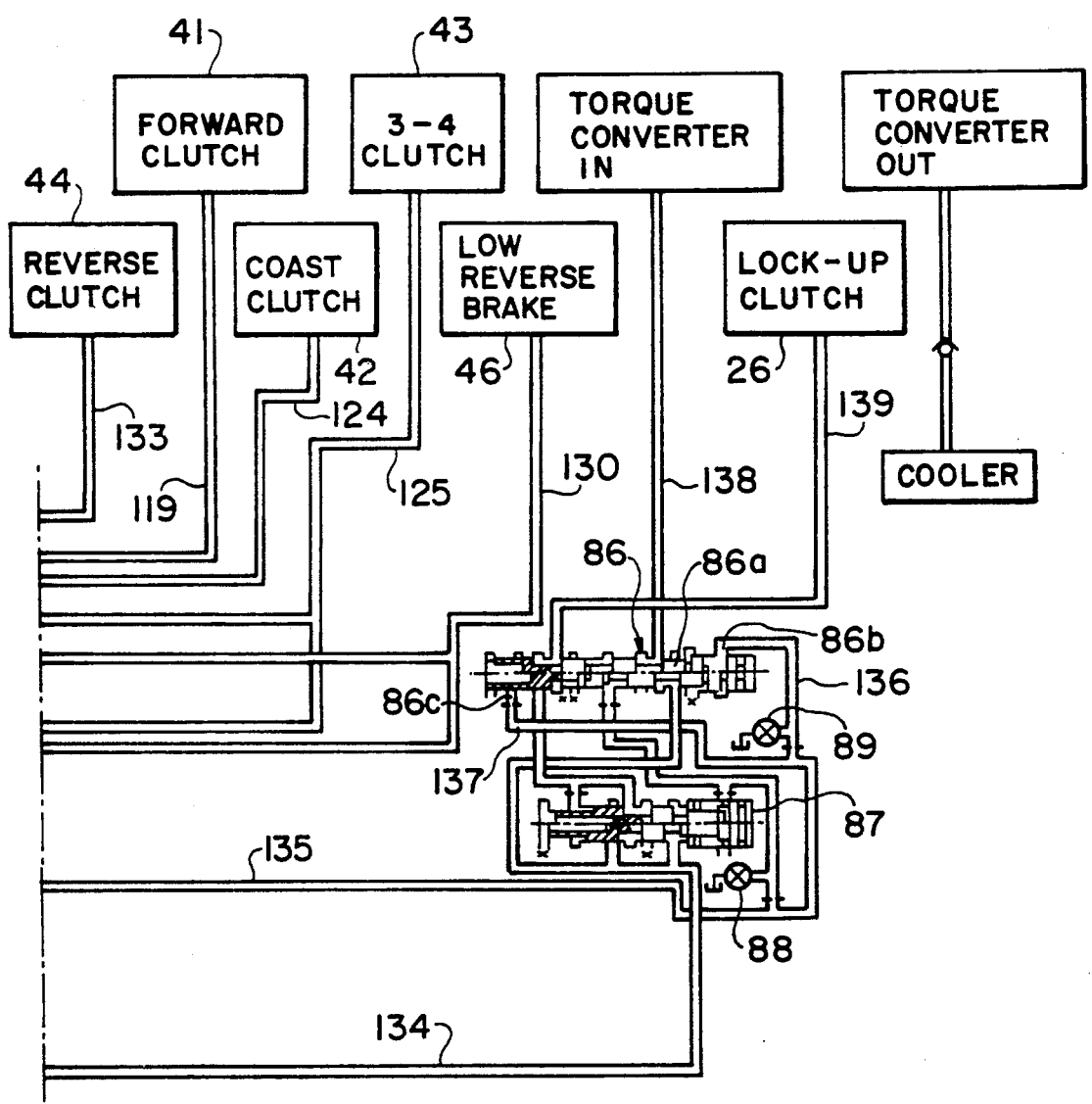

Hereinafter, a hydraulic control circuit 60 is explained by making reference to FIG. 2.

switch of hydraulic path communicated with the frictional elements 41-46 through the shift of the spools 63a–65a of the shift valves 63–65. Thus, the frictional element 41–46 are selectively engaged as shown in Table 1 to establish a specific shift stage. In this case, a relationship between the ON and OFF conditions of the solenoid valves 66–68 and the shift stages is shown in Table 2.

TABLE 2

|  | D | | | | | 2 | | | 1 | |
|---|---|---|---|---|---|---|---|---|---|---|
|  | 1 | 2 | 2→3 | 3 | 4 | 1 | 2 | 3 | 1 | 2 |
| 1-2 SOLENOID VALVE (66) | OFF | ON | ON | ON | ON | OFF | ON | ON | OFF | ON |
| 2-3 SOLENOID VALVE (67) | ON | ON | ON | OFF | OFF | ON | ON | OFF | ON | ON |
| 3-4 SOLENOID VALVE (68) | ON | ON | OFF | OFF | ON | ON | OFF | OFF | OFF | OFF |

When a down shift is made from the third to second stages, an intermediate stage is established.

A forward clutch line 119 is separated from the first output line 111 connected with the main line 110. The line 119 is connected with a forward clutch 41 through a one-way orifice. Thus, in the D, 2 and L-range, the forward clutch 41 is engaged. A N-D accumulator 72 is connected with the forward clutch line 119 through a line 120 for providing a damping effect during the engagement of the forward clutch 1. A numeral 73 designates a one-way orifice.

The first output line 111 is connected with the 1-2 shift valve 63. When the 1-2 solenoid valve 66 is turned ON to move the spool 63a of the 1-2 shift valve 63 rightwardly, the line 111 is communicated with a servo apply line 121 so that the hydraulic pressure is introduced to the apply port 45a' of the servo piston 45' through a one-way orifice 74. Thus, when the 1-2 solenoid valve 66 is ON in the D, 2 and L-ranges, in other words, when the second, third or fourth stage is established in the D-range, when the second or third stage is established in the 2-range and when the second stage is established in the L-range, the hydraulic pressure is introduced into the apply port 45a' as a servo apply pressure. In this case, when the hydraulic pressure is not introduced into the release port 45b' wherein the second or fourth stage in the D-range, the second stage in the 2-range or the second stage in the L-range is established, the 2-4 brake is engaged. A 1-2 accumulator 75 for damping in engaging the 2-4 brake 45 is connected with the apply port 45a' through a line 122.

The first output line 111 is communicated with the 3-4 shift valve 65 and with a line 123 when the 3-4 solenoid valve 68 is OFF and the spool 65a is in the left position. The line 123 is communicated with the 2-3 shift valve 64 and with a coast clutch line 124 when the 2-3 solenoid valve 67 is ON and the spool 64a is in the right position. The coast clutch line 124 is communicated with the coast clutch 42 through a one-way orifice 76 and a ball valve 77 for switching the hydraulic passage. Thus, when the 2-3 solenoid valve 67 is ON and the 3-4 solenoid valve 68 is OFF, in other words when the second stage in the 2-range and the first or second stages in the L-range are established, the coast clutch 42 is engaged.

The second output line 112, communicated with the main line 110 in the D and 2-ranges, is communicated with the 2-3 shift valve 64. When the 2-3 solenoid valve 67 is OFF and the spool 64a is in the left position, the second output line 112 is communicated with a 3-4 clutch line 125, which is connected with the 3-4 clutch 43 through a one-way orifice 78. Thus, when the 2-3 solenoid valve 67 is OFF in the D or 2-range, in other words, when the third or fourth stage in the D-range, or the third stage in the 2-range is established, the 3-4 clutch 43 is engaged. An accumulator 79 for damping engagement of the 3-4 clutch 43 is connected with the clutch line 125. A number 80 indicates a one-way orifice.

A line 126, separated from the 3-4 clutch line 123 is communicated with the 3-4 shift valve 65 and with a line 127 when the 3-4 solenoid valve 68 is OFF in and the spool 65a is in the left position, and with a servo release line 128 through a 2-3 timing 102. The servo release line 128 is communicated with the release port 45b' of the servo piston 45' through a one-way orifice 81. Thus, when both the 2-3 and 3-4 solenoid valves 67 and 68 are OFF in the D or 2-range, in other words, when the third stage is in the D or 2-range, the servo release pressure is introduced into the release port 45b' of the servo piston 45' to release the 2-4 brake 45.

A line 129, separated from the servo release line 128, is communicated with a coast clutch line 124 and with the coast clutch 42 through a coast control valve 82 and the ball valve 77. Thus, when the third stage is established in the D-range and 2-range in which teh hydraulic pressure is introduced into the servo release line 128, the coast clutch 42 is engaged.

The third output line 113 communicated with the main line 110 through the manual valve 62, is communicated with the 1-2 shift valve 63 through a ball valve 83 as a switching valve. The line 113 is communicated with a low reverse brake line 130 when the 1-2 solenoid 66 valve is OFF to place the spool 63a at the left position and with the low reverse brake 46 through a one-way orifice 84 for the accumulator. The low reverse brake 46 is engaged when the 1-2 solenoid valve 66 is OFF in the L-range or when the first stage is established in the L-range. In the illustrated embodiment, the third output line 113 constitutes a lower range circuit in the manual valve 62.

A bypass passage 131 is provided on the low reverse brake line 130. The bypass passage 131 includes a first bypass passage 131a separated from an upstream portion of the line 130 and communicated with the 3-4 shift valve 65, and a second bypass passage 131b extended from the 3-4 shift valve 65 to a downstream portion of the one-way orifice 84. When the 3-4 solenoid valve 68 is OFF to place the spool 65a at the left position, the first and second bypass passage 131a and 131b are communicated with each other.

The low reverse brake line 130 is connected with a N-R accumulator 85 for damping when the low reverse brake is engaged.

The fourth output line 114, communicated with the main line 110 when the manual valve 62 is in the R-range, is communicated with the ball valve 83 through a line 132 separated from the line 114. Further, the fourth output line 114 is communicated with the reverse clutch through a reverse clutch line 133. Thus, in the R-range, only when the 1-2 solenoid 66 is OFF, the low reverse brake 46 is engaged. The reverse clutch is kept engaged in the R-range. In short, the fourth output line 114 and the line 132 separated from the line 114 forms the R(reverse)-range of the manual valve 62.

The hydraulic control unit 60 is also provided with a 5 lock-up shift valve 86 for actuating the lock-up clutch 26 of the torque converter 20 shown in FIG. 1 and a lock-up control valve 87 for adjusting the hydraulic pressure introduced into the torque converter 20. Numbers 88 and 89 designate a duty solenoid valve and a lock-up solenoid valve, respectively.

The lock-up shift valve 86 is connected with the regulator valve 61 through a torque converter line 134. First and second pilot ports 86b and 86c provided at opposite ends of the valve 86 are communicated with lines 136 and 137 separated from a pilot line 135, which is separated from the main line 110 and provided with a reducing valve 90. The lock-up solenoid valve 89 is provided on the line 136. When the lock-up solenoid valve 89 is ON, placing the spool 86a of the lock-up shift valve 86 at the right position, the torque converter line 134 is communicated with a torque converter line 138 and with the inside of the torque converter 20 so that the hydraulic pressure in the torque converter 20 is increased to engage the lock-up clutch 26. When the lock-up solenoid valve 89 is OFF to move the spool 86a of the valve 86 leftward, the converter line 134 is communicated with a lock-up release line 139 so that a lock-up release pressure is introduced into the torque converter 20 to release the lock-up clutch 26. Numeral 94 designates a converter release valve.

In addition, the hydraulic control circuit 60 is provided with a bypass valve 101 and a 3-2 timing valve 103 in addition to the coast timing valve 82 and the 2-3 timing valve 102.

The coast timing valve 82 is disposed on a line 129 separated from the line 128 and communicated with the coast clutch line 124 through the ball valve 77. The servo apply pressure is introduced to one end of the spool 82a through a line 140 separated from the servo apply line 121. When the servo release pressure introduced into the other end of the spool 82a through the line 129 added to a spring force is increased beyond the servo apply pressure, the line 129 is opened. Therefore, when a shift up operation from the second to the third stage (a 2-3 shift-up operation) is made in the D or 2 range, the coast clutch 42 is engaged after the servo release pressure is increased enough to release the 2-4 brake 45. As a result, a double lock condition in which both the 2-4 brake 45 and the coast clutch 42 are engaged concurrently can be avoided. In this case, the servo apply pressure is introduced into one end of the spool 82a of the coast timing valve 82 so that the communication timing of the line 129 is changed in accordance with the servo apply pressure. As a result, a relationship between the communication timing and the pressure level of the servo release can be maintained appropriately.

The one-way valve 101 is provided on a bypass line 141 which bypasses the one-way orifice 78 provided on the 3-4 clutch line 125. A spool 101a of the valve 101 is subjected to a 3-4 clutch pressure produced at downstream of the one-way orifice 78 at one end, and subjected to a throttle modulator pressure adjusted by a regulator valve 91 to a pressure corresponding to the engine load at the other end through a line 142. When the 3-4 clutch pressure is increased beyond a predetermined value to move the spool 101a to the left position, the bypass line 141 is interrupted. At the beginning, the 3-4 clutch pressure is increased quickly by the hydraulic pressure introduced through the bypass line 141. Thereafter, the 3-4 clutch pressure is increased gradually by means of the one-way orifice 78. As a result, the engaging timing of the 3-4 clutch 43 can be controlled in the 2-3 shift up operation. Numbers 92 and 93 designate a duty solenoid valve and accumulator.

The 2-3 timing valve 102 is provided between the servo release line 128 and a line 127 communicated with the 3-4 shift valve 65. A spool 102a of the valve 102 is subjected to the 3-4 clutch pressure at one end and to the servo release pressure at the other end. The valve 102 communicates the servo release line 128 with the line 127 and drains the line 128 in accordance with the servo release pressure so that the servo pressure is controlled in response to the 3-4 clutch pressure.

The 3-2 timing valve 103 is provided between a first bypass line 143 bypassing the one-way orifice 74 on the servo apply line 121 and a second bypass line 144 bypassing the one-way orifice 71 on the forward clutch line 119. The valve 103 is communicated with a pilot line 145 separated from a line 118 communicated with the main line 110 at one end portion of a spool 103a, and communicated with a drain line 146 separated from the servo release line 128 at an intermediate portion of the spool 103a. The pilot line 145 is provided with a 3-2 solenoid valve 95. The timing valve 103 opens and closes the first and second bypass lines 143 and 144 in accordance with the 3-2 solenoid valve 95 in a 1-2 shift up operation (shift up operation from the first stage to the second stage), the 3-2 shift down operation, and a 4-2 shift down operation (shift down operation from the fourth stage to the second stage) so as to control hydraulic supply timing. In detail, the valve 103 is operated to communicate the first bypass line 143 so as to provide the apply port 45a' with the servo apply pressure increasing rapidly in an initial stage of the 1-2 shift up operation. After a certain time period from the start of the shift operation, the first bypass line 143 is interrupted so that the servo apply pressure, increasing gradually, is introduced into the apply port 45a' of the servo piston 45' through the one-way orifice 74. In the 3-2 shift down operation, the valve 103 communicates the drain line 146 with a drain port and thereafter interrupts the drain line 146. As a result, the servo release pressure is decreased quickly at an initial stage of the shift operation through the drain line 146 and decreased gradually at a final stage of the shift operation through the one-way orifice 81 which reduces a flow area of the servo release line 128. In the 4-2 shift down operation, the valve 103 opens the second bypass line 144 at an initial stage so that the forward clutc pressure, increasing rapidly, is introduced into the forward clutch 41. At final stage of the shift operation, the second bypass line 144 is closed so that the forward clutch pressure increasing gradually by virtue of the one-way orifice is introduced into the forward clutch 41. The main line 110 is communicated with back pressure ports 72a, 75a, 79a and 85a of the accumulators 72, 75, 79 and 85 to provide them with the hydraulic pressure. The main line 110 is provided with the regulator valve 91 connected with the reducing valve 90 and the duty solenoid valve 92. The duty solenoid valve 92, which is controlled by a ON-OFF signal, is actuated to drain the main line 110 when it is ON so that the back pressure acting on the accumulators 72, 75, 79 and 85 is reduced. Thus, the back pressure provided by the main line 110 is controlled by a duty ratio of the duty solenoid valve 92.

Figure 3:
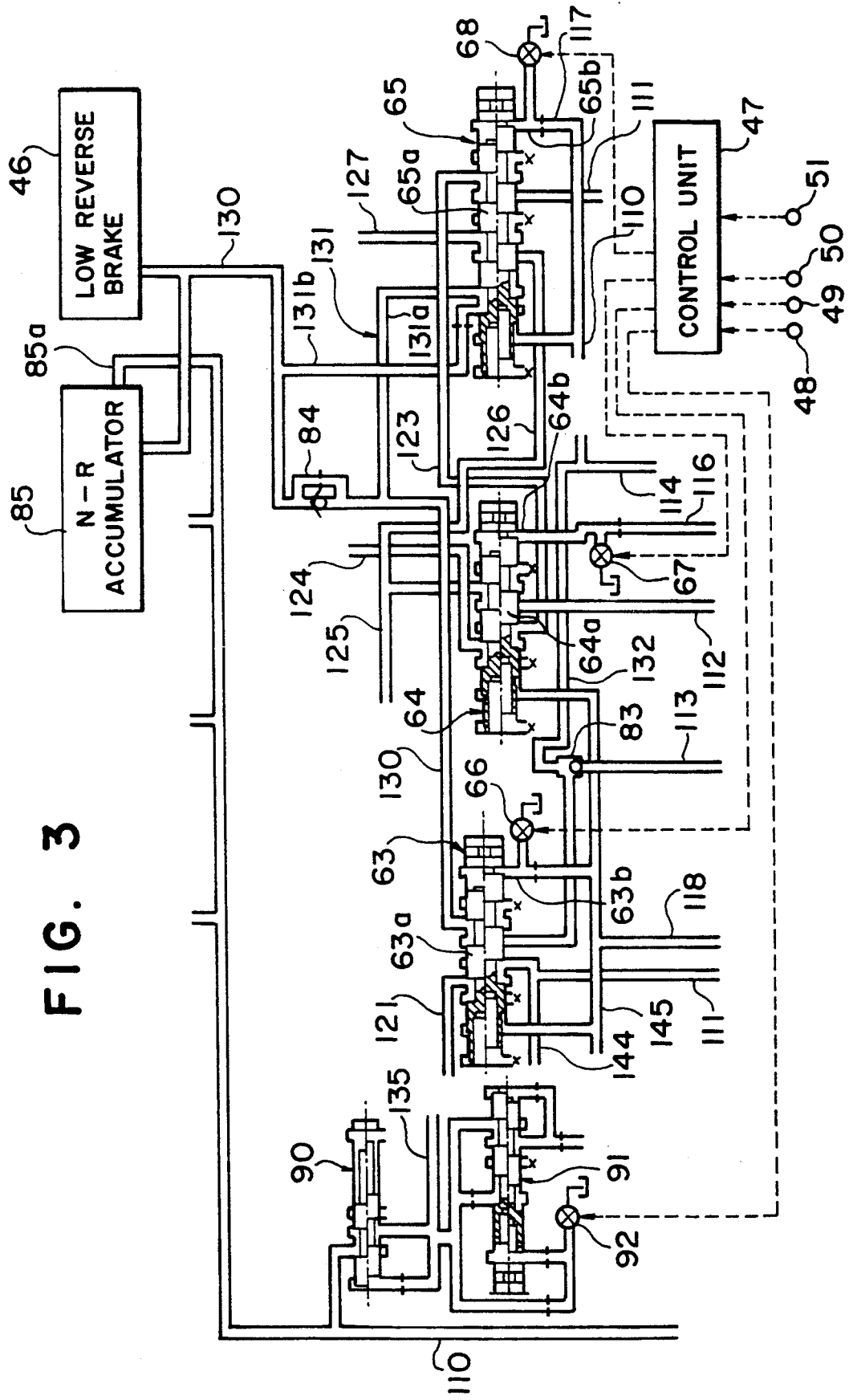
FIG. 3 shows a part of the hydraulic control circuit of FIG. 2.

As shown in FIG. 3, the hydraulic control circuit 60 is provided with a control unit 47 for controlling the 1-2, 2-3 and 3-4 solenoid valves 66, 67 and 68 through an open-close control and the duty solenoid valve 92 through the duty control.

The control unit 47, which may include a micro computer, is provided with a range detecting section 48 for detecting a range of the manual valve 62 by means of a range signal Rg(t), a shift stage detecting section for detecting a shift stage of the transmission through a shift signal H, a speed detecting section 50 for detecting the vehicle speed V and oil temperature detecting section 51 for detecting an oil temperature of the transmission. The control unit 47 produces control signals to open and close the 1-2, 2-3 and 3-4 solenoid valves 66, 67 and 68 and for the duty solenoid valve 92 for duty control. In the illustrated control system, the reducing valve 90, the regulator valve 91, the duty solenoid valve 92 and the control unit 47 forms a back pressure control means. In this case, the 1-2, 2-3 and 3-4 solenoid valve 66, 67, 68 is controlled in accordance with control patterns (1) or (2) shown in Table 3

TABLE 3

| | PATTERN | |
|---|---|---|
| | (1) | (2) |
| 1-2 SOL VALVE (66) | OFF | ON |
| 2-3 SOL VALVE (67) | OFF | OFF |
| 3-4 SOL VALVE (68) | OFF | ON |

Figure 4:
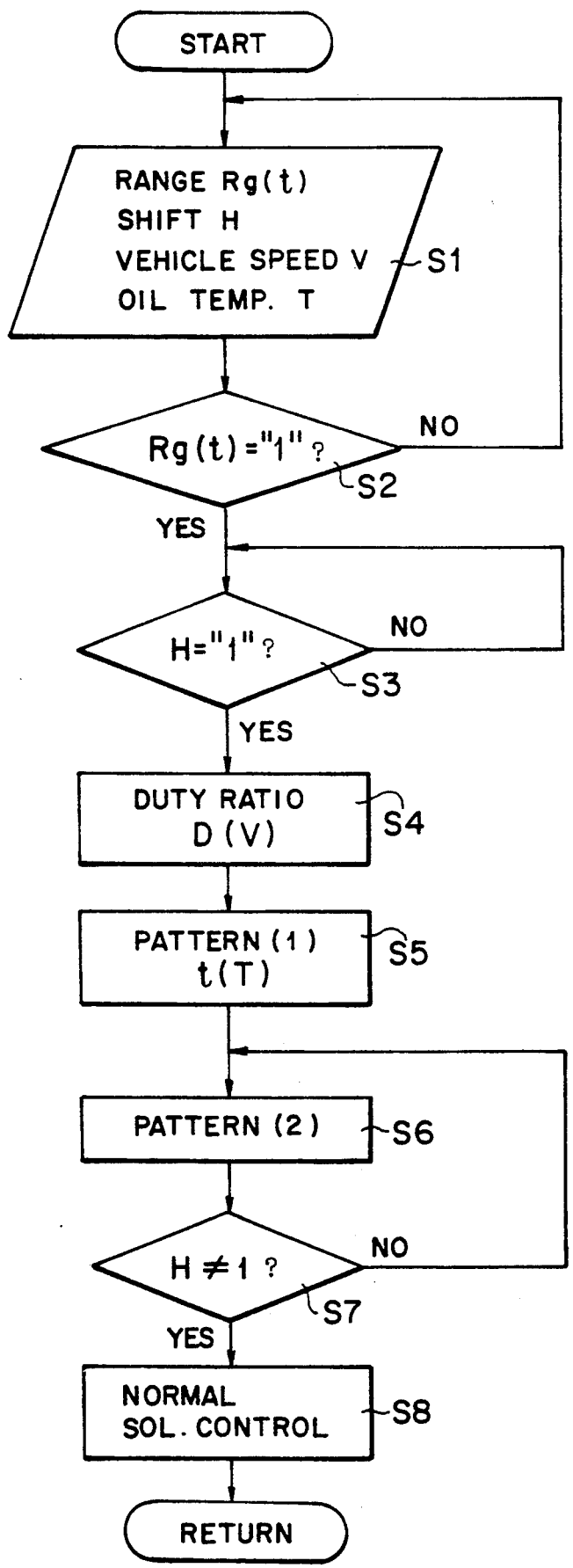
FIG. 4 is a flow chart of a control for solenoid valves.

A shift control in the L-range will now be explained, making reference to FIG. 4.

Figure 5:
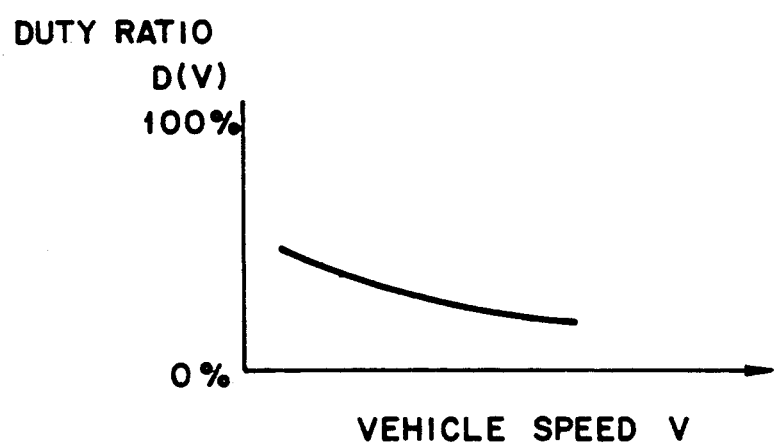
FIG. 5 is a graphical representation showing a relationship between duty ratio and vehicle speed.
Figure 6:
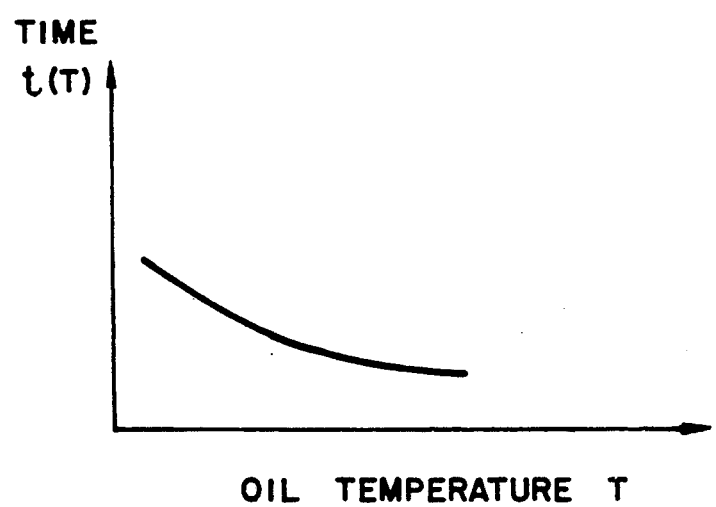
FIG. 6 is a graphical representation showing a relationship between a time period for a solenoid control and oil temperature of the transmission.

During operation of the vehicle, the control unit 47 receives signals from the range detecting section 48, the shift stage detecting section 49, the vehicle speed detecting means 50 and the oil temperature detecting means (S1). In step S2, the control unit 47 judges whether or not the current shift range is the L-range based on the signal Rg(t). If the judgment is Yes, the control unit 47 further judges whether or not the shift stage is the first stage based on the signal H (S3). If this judgment is Yes or if the shift stage is the first stage, the control unit 47 obtains a duty ratio D(V) (valve opening ratio in one ON-OFF cycle) in light of a map shown in FIG. 5 based on the vehicle speed V and executes the duty control for the duty solenoid valve 92 (S4). Therefore, the back pressure of the N-R accumulator 85 is controlled in accordance with the vehicle speed V to form an optimal accumulating pressure. The back pressure of the accumulator is increased as the vehicle speed is increased. Then, the control unit 47 goes to step S5 in which the solenoid valves 66, 67 and 68 are controlled for a predetermined time period t(T) in accordance with the pattern (1) of the Table 3. Then, in step S6, the valves 66, 67 and 68 are controlled in accordance with the pattern (2) of the Table 3. The time period t(T) is calculated as a function of the oil temperature T which is provided in light of a map shown in FIG. 6. As the oil temperature is decreased, in other words when oil viscosity is increased, the time period t(T) is increased. On the other hand, as the oil temperature is increased (the oil viscosity is decreased), the time t(T) is decreased. When the solenoid valves 66, 67 and 68 are controlled in accordance with the pattern (1), the passage 131 bypassing the one-way orifice 84 is opened so that the time t(T), for which the hydraulic pressure is quickly introduced into the low reverse brake 46 through the bypass passage 131, is determined in correspondence with the oil viscosity. Thus, a pressure accumulated in the accumulator N-R can be established quickly. Thereafter, the control of the solenoid valves 66, 67 and 68 is transferred to the pattern (2) so that the hydraulic pressure is gradually introduced into the low reverse brake 46. Then, the control unit 47 judges the signal H in step S7. If the signal H is "1" or if the shift stage is the first stage, the pattern (2) is maintained for controlling the valve 66, 67 and 68. If the judgment is No in the step S7 or if the shift stage is not the first stage, the solenoid valve is controlled based on the table 2 (step S8).

According to the illustrated embodiment, when the manual valve 62 is shifted to the L-range and the first stage is established in the transmission, the hydraulic pressure is quickly increased through the bypass passage 131 for the accumulator 85 and introduced into the low reverse brake 46. Thereafter, the hydraulic pressure is gradually introduced into the low reverse brake 46 so that it is engaged. The back pressure of the N-R accumulator 85 is controlled in accordance with the vehicle speed to form the optimal pressure accumulated in the accumulator 85.

In the above embodiment, although the bypass passage 131 is opened and closed by the 3-4 shift valve 65, the passage 131 can be opened and closed by the shift valve 64 instead.

Although the present invention has been explained with reference to a specific, preferred embodiment, one of ordinary skill in the art will recognize that modifications and improvements can be made while remaining within the scope and spirit of the present invention. The scope of the present invention is determined solely by the appended claims.

What is claimed is:

1. A control system for an automatic transmission comprising:
   a shift gear mechanism having a plurality of frictional elements including a low reverse brake, selectively actuated for switching a power transmitting path to establish a desired shift stage, and a hydraulic control circuit for controlling a hydraulic fluid for the frictional elements,
   an accumulator provided in a hydraulic passage communicated with the low reverse brake for obviating a shock as the low reverse brake is engaged, and
   back pressure control means for controlling a back pressure of the accumulator when a first stage is established in the shift gear mechanism through the engagement of the low reverse brake, the back pressure of the accumulator being changed in accordance with at least one driving condition.

2. A control system for an automatic transmission comprising:
   a shift gear mechanism having a plurality of frictional elements including a low reverse brake, selectively actuated for switching a power transmitting path to establish a desired shift stage, and a hydraulic control circuit for controlling a hydraulic fluid for the frictional elements,
   an accumulator provided in a hydraulic passage communicated with the low reverse brake for obviating a shock as the low reverse brake is engaged, and
   back pressure control means for controlling a back pressure of the accumulator when a first stage is established in the shift gear mechanism through the engagement of the low reverse brake, the back pressure being controlled by a duty solenoid valve.

3. A control system as recited in claim 1 wherein the low reverse brake is engaged when the shift range is a range for reverse movement and when the shift stage is a first stage in a low range.

4. A control system for an automatic transmission comprising:
- a shift gear mechanism having a plurality of frictional elements including a low reverse brake, selectively actuated for switching a power transmitting path to establish a desired shift stage, and a hydraulic control circuit for controlling a hydraulic fluid for the frictional elements,
- an accumulator provided in a hydraulic passage communicated with the low reverse brake for obviating a shock as the low reverse brake is engaged, and
- back pressure control means for controlling a back pressure of the accumulator when a first stage is established in the shift gear mechanism through the engagement of the low reverse brake, the back pressure being increased as vehicle speed is increased.

5. A control system for an automatic transmission comprising:
- a shift gear mechanism having a plurality of frictional elements including a low reverse brake, selectively actuated for switching a powr transmitting path to establish a desired shift stage, and a hydraulic control circuit for controlling a hydraulic fluid for the frictional elements,
- an accumulator provided in a hydraulic passage communicated with the low reverse brake for obviating a shock as the low reverse brake is engaged,
- back pressure control means for controlling a back pressure of the accumulator when a first stage is established in the shift gear mechanism through the engagement of the low reverse brake,
- a hydraulic passage, provided with an orifice therein, communicated with the accumulator,
- a bypass passage bypassing the orifice and communicated with the accumulator,
- a shift valve for opening and closing the bypass passage, and
- an on-off solenoid valve for controlling the shift valve.

6. A control system as recited in claim 5 wherein the hydraulic pressure is introduced into the accumulator and the low reverse brake through the bypass passage at an initial stage of a shift operation in which the low reverse brake is engaged and thereafter through the orifice.

7. A control system as recited in claim 5 wherein the on-off solenoid valve is turned on when a shift operation is started to engage the low reverse brake.

8. A control system as recited in claim 7 wherein the bypass passage is kept open to introduce the hydraulic pressure into the accumulator and the low reverse brake when the on-off solenoid valve is on.

9. A control system as recited in claim 8 wherein the bypass passage is opened at an initial stage of a shift operation in which the low reverse brake is engaged.

10. A control system as recited in claim 5 wherein the hydraulic pressure introduced into the accumulator and the low reverse brake through the bypass passage is quickly increased.

11. A control system as recited in claim 5 wherein the hydraulic pressure is gradually introduced into the accumulator and the low reverse brake through the orifice.

12. A control system as recited in claim 5 wherein a time period when the hydraulic pressure is introduced into the accumulator through the bypass passage is controlled in accordance with an oil temperature of the automatic transmission.

13. A control system as recited in claim 12 wherein the time period is increased as the oil temperature is decreased.

* * * * *